ASSOCIATIVE MEMORY FOR SUBROUTINES

Filed June 28, 1963 5 Sheets-Sheet 1

INVENTOR
ARWIN B. LINDQUIST

BY John A. Harvey

ATTORNEY

Dec. 6, 1966 A. B. LINDQUIST 3,290,656

ASSOCIATIVE MEMORY FOR SUBROUTINES

Filed June 28, 1963 5 Sheets-Sheet 2

Dec. 6, 1966 A. B. LINDQUIST 3,290,656

ASSOCIATIVE MEMORY FOR SUBROUTINES

Filed June 28, 1963 5 Sheets-Sheet 4

United States Patent Office 3,290,656
Patented Dec. 6, 1966

3,290,656
ASSOCIATIVE MEMORY FOR SUBROUTINES

Arwin B. Lindquist, Poughkeepsie, N.Y., assignor to International Business Machines Corporation, New York, N.Y., a corporation of New York Filed June 28, 1963, Ser. No. 291,504
19 Claims. (Cl. 340—172.5)

Figure 1:
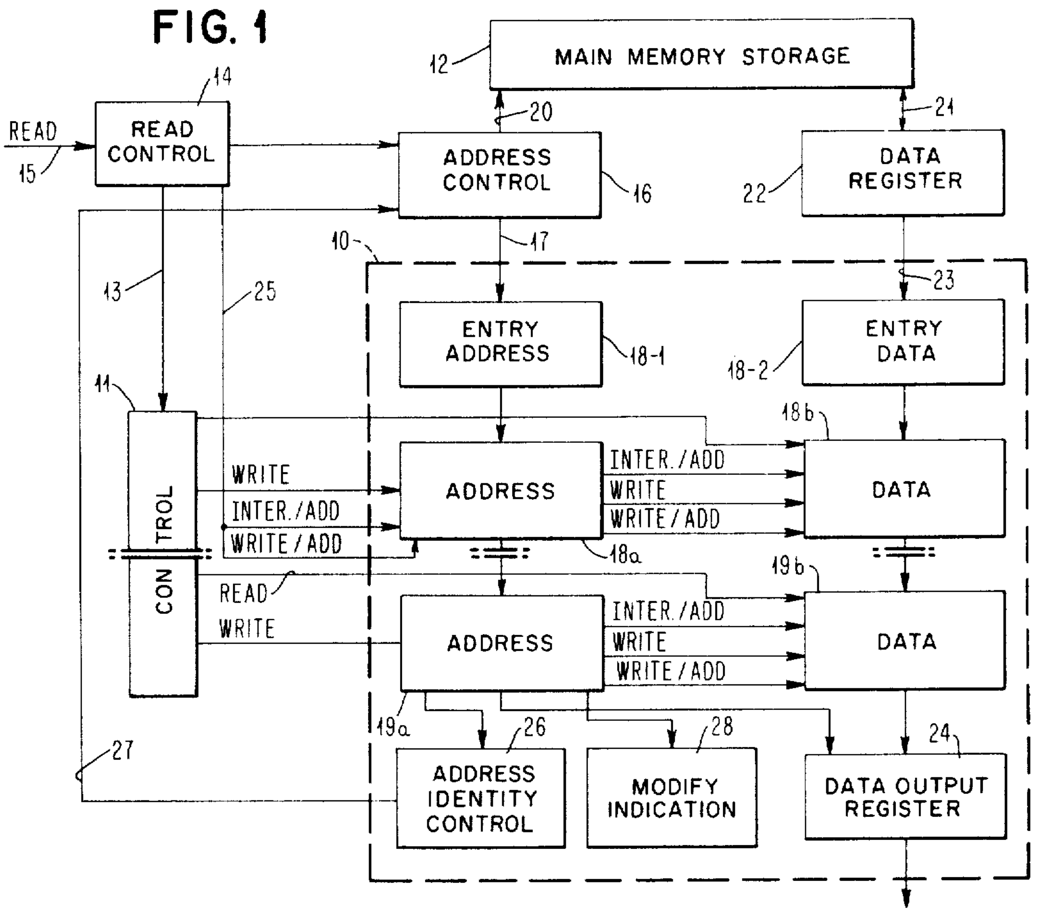

The present invention relates to information storage systems and, more particularly, to those suitable for use as components of a larger data processing system. While the invention has general application, it has particular utility for use in data processing systems wherein data is processed by repetitive use of data or processing information received from storage.

The rapidity with which data may be processed by data processing systems has been extensively improved in recent years by reason of improved processing techniques and components. This improvement has not in general extended to large capacity information storage systems, however, and particularly is this true with respect to those possessing a relatively large number of randomly available address-selectable word storage locations used to store both original and processed data words and also various types of processing words. It is through these storage systems that all original and processed data must ordinarily pass between the processing system and independently operating peripheral input-output data equipments. Also much data often flows through the storage system during each data processing operation, and different processing operations may be progressing concurrently in various ones of plural independently operating processing units or sections of the overall processing system. Each unit of input and output equipment operates independently and requires independent access to the storage system, and each independently operating unit or section of the processing system also often requires independent access to the storage system. While the input-output equipments require access merely to supply data for storage or to receive data from storage, the processing system and its independently operating units or sections often make repetitive access demands to receive the same data or processing information from storage either for use in a given processing operation in progress or for use in successive operations of similar type.

The large capacity information storage systems used as components of a larger data processing system accordingly have many and frequent access demands made upon them. To avoid conflict between access demands concurrently received or between those which cannot be honored immediately upon receipt, priorities are usually assigned to certain of the access demands as received and the remainder are usually accumulated to be honored in the order with which they are received. The operational rate of the processing system is undesirably reduced to the extent that these access demands cannot be immediately honored. Even when honored, the access time required for information to be received or supplied in response to the demand is relatively long in large capacity information storage systems as compared with the rate at which units of data may be processed. This fact further tends undesirably to reduce the operational rate of the overall data processing system, especially when a large volume of access demands is concerned with repetitive demands to receive the same data or processing information from storage.

The information storage system of the present invention relieves the number of access demands made on the large capacity information storage system. This is accomplished by combining with the latter a relatively small, fast, associative memory unit which cooperates automatically to provide and make readily and rapidly available by address selection a continuing "mirror image" of the latest program instruction words with associated record, index, and subroutine words and other such information recently used and thus most likely to be repetitively used in data processing operations in progressing to completion.

It is an object of the present invention to provide an improved information storage system which may form a component of or be used in association with a large capacity information storage system to relieve substantially the volume of access demands made upon the latter.

It is a further object of the invention to provide an information storage system of exceptionally fast access time and automatically operative to preserve and make rapidly available, as selectively required, a limited quantity of current information repetitively used in data processing operations.

It is an additional object of the invention to provide an associative information storage system characterized by unique operational flexibility permitting as desired at any time the successve storage and successive read out of information words successively presented for storage, the successive storage and address-selective random read out of stored information words, and the address-selective random modification of one or more words in storage accompanied by an indication identifying each word so modified.

The foregoing and other objects, features and advantages of the invention will be apparent from the following more particular description of a preferred embodiment of the invention, as illustrated in the accompanying drawings.

Figure 3:
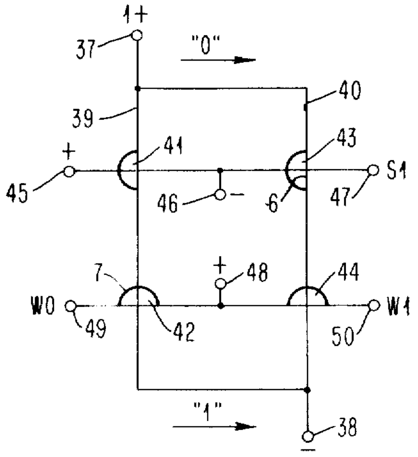
Figure 2:
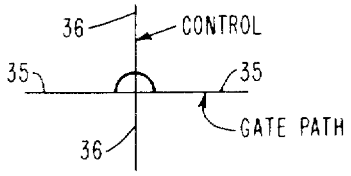

FIG. 1 of the drawings represents schematically in block diagram form a complete information storage system embodying the present invention in a particular form; FIG. 2 represents schematically a form of crossed-film cryotron used extensively in the particular form of storage system herein described by way of example as a suitable embodiment of the invention; FIG. 3 represents schematically a cryotron form of unit information storage circuit and is used as an aid in explaining operational features of the storage system herein rescribed; and FIGS. 4*a*–4*d* arranged as in FIG. 4 comprise a circuit diagram showing the more detailed circuit arrangement of a representative form of information storage system embodying the invention.

Referring now more particularly to FIG. 1, an information storage system embodying the invention includes an associative information storage unit 10 requiring relatively short information-access time and having a relatively small number of discrete word storage locations. This unit effects word storage operations under control of a control unit 11, which is responsive to each succeeding one of a preselected type of address-selected read-out operation of a large capacity information storage unit 12 hereinafter referred to for convenience as a main memory storage unit. In particular, the control unit 11 is operationally controlled by signals hereinafter identified more fully and which are supplied through a control channel 13 from a read-control unit 14 forming a component of a data processing system. The read-control unit 14 is conventional and is responsive to a read-control signal, supplied by the data processing system through a control circuit 15, to supply to an address control unit 16 of the processing system the address of an information word to be read from the main memory storage unit 12. Each successive such address supplied to the address control unit 16 is supplied through an address channel 17 to temporary storage in an entry address portion 18–1 of the associative storage unit 10, and each such address is then received from the entry address portion 18–1 and stored in successive word storage registers of this unit successively selected under control of the control unit 11 operating as a form of ring control switch or counter stepped each time that a write-control signal is received through the control channel 13 from the read-control unit 14. Each word storage register of the associative unit 10 includes an address storage portion 18*a* and a data storage portion 18*b*, there being only a limited number of such discrete word storage registers of which for simplicity only one additional register 19*a*, 19*b* is particularly shown in FIG. 1.

The word address supplied to the address control unit 16 is supplied through an address channel 20 to the main memory storage unit 12 to cause the latter to read out from the addressed word location a data word which is translated through a data channel 21 to storage in a data register 22 of the data processing system. In this it will be understood that the main memory storage unit 12 is of conventional construction and operation, as for example one of the core storage type, having the capacity to store a relatively large number of information words at address-selectable storage locations. As is characteristic of large memory storage units, the access time required to translate an information word to or from storage at an addressed location is relatively long and requires a significant interval of time for its execution. Each data word thus stored in the data register 22, and the term "data" is here used in its generic sense as applicable to information words generally including main and subroutine program instruction words and index and record words as well as data words, is supplied through a data input channel 23 to temporary storage in an entry data portion 18–2 of the associative storage unit 10. This supplied data word is stored in the same word storage register as selected by the control unit 11 for concurrent storage of the address portion of the data word as earlier described. The successive storage register selection by the control unit 11 is such that successive word storage occur in order from the first to the last word register and then begins again by overwriting a word in the first word register so that the associative storage unit contains, within its storage capacity, the latest words and associated word addresses read from the main memory storage unit 12.

The words stored at any time in the data storage word register portions 19*a*, 19*b*, etc. may be read in succession to a common data word output register 24 for use by the data processing system. This form of word read out operation is under control of the control unit 11 which receives a read signal through the control channel 13 and advances its count each time the read signal is received. This read operation is similar to the earlier described write operation, except that the reading of successive data words to the output register 24 is not accompanied by reference to or reading of the successive word addresses stored in the address portions 18*a*, 19*a*, etc. of the word registers.

The read control unit 14 may also interrogate the associative storage unit 10 by a read signal supplied through a control channel 25 directly to the address storage portions 18*a*, 19*a*, etc. of the word storage registers. In this instance, the control unit 14 concurrently supplies an address to the address control unit 16 and this address is supplied to and stored in the entry address portion 18–1 of the associative storage unit 10. The read signal supplied through the control channel 25 now uses the address stored in the entry address portion 18–1 to interrogate concurrently all word addresses stored in the address storage portions 18*a*, 19*a*, etc. of the word storage registers. If one of the stored word addresses corresponds to the interrogating address in the entry address portion 18–1, that word is immediately read to the data output register 24 for use by the processing system. At the same time, an address identity control unit 26 is energized to indicate that a condition of address identity has been found to prevail and that a word read out operation accordingly has taken place. Since the associative storage unit 10 requiress only a relatively short information access time within which to accomplish this interrogation read out operation, the appearance of a read signal in the control channel 25 effects an almost simultaneous energization of the address identity control unit 26. The latter may control by way of a control circuit 27 the address control unit 16 immediately to suppress the normal operation of the unit 16 in demanding access to the main memory storage unit 12 to effect read out of an addressed word from the latter, or control of basic timing controls may be used to effect suppression of the main memory operating cycle and the initiation of a new operating cycle.

The two foregoing described forms of word read out from the associative storage unit 10 enables words which are stored in this unit to be made immediately available to the data processing system, and thus substantially reduces the quantity of word read out demands which would otherwise be made on the main storage unit 12. This enables the main storage unit to remain more current in honoring other access demands made upon it.

It is sometimes desirable that a data word stored in the associative storage unit 10 be "updated" or otherwise modified or even that it be replaced by another word. This may be accomplished in the information storage system herein described by a write signal supplied through the control channel 25 from the read control unit 14, which then concurrently supplies an address to the address control unit 16 for temporary storage in the entry address portion 18–1 of the associative storage unit 10. The write signal supplied through the control channel 25 now uses the address portion 18–1 to interrogate concurrently all the word addresses stored in the address storage portions 18*a*, 19*a*, etc. of the word storage registers. If one of the stored word addresses corresponds to the interrogating address, a data word stored at that time in the data register 22 (usually being placed there by the data processing system) is immediately stored by way of the entry data portion 18–2 in the particular data storage portion 18*b*, 19*b*, etc. of the word storage register in which address identity is found to prevail during the address interrogation. A modify indication unit 28 is thereupon energized to provide an indication that the data word in a particularly identified word register has been so modified or replaced. Energization of the unit 28 may then be utilized by the data processing system to effect later read out of this modified word to the data output register 24 by an appropriate interrogation-address read operation of the associative storage unit 10, and the subsequent storage of the word thus read out in a desired word storage location of the main memory storage unit 12.

Various forms of associative memory storage units suitable for use in the invention are now well known in the art. For example, magnetic forms of associative memory are disclosed in a paper by Kiseda et al. entitled "A Magnetic Associative Memory," appearing in International Business Machines Journal, vol. 5–2 (1961), page 106, and in a paper by McDermit et al. entitled "A Magnetic Associative Memory System" appearing in the International Business Machines Journal, vol. 5–1 (1961), page 59. See also a paper by Seeber et al. entitled "Tag-Addressed Memory" appearing in the International Business Machines Technical Disclosure Bulletin, vol. 4, No. 10 (March 1962), page 73; a paper by Scriver et al. entitled "Logical Circuits and Memory," appearing in the International Business Machines Technical Disclosure Bulletin, vol. 4, No. 12 (May 1962), page 64, and a paper by Anderson entitled "Search on Range Associative Memory" appearing in the International Business Machines Technical Disclosure Bulletin, vol. 5, No. 5 (October 1962), page 38. Another form of associative memory unit suitable for use in the invention is one of the cryogenic type such as that disclosed in a paper by Seeber et al. entitled "Associative Memory with Ordered Retrieval" appearing in the International Business Machines Journal, January 1962, page 126. The detailed circuit arrangement of an information storage system hereinafter described as embodying the present invention is one which uses an associative memory unit of the cryogenic type.

The construction and mode of operation of crossed-film cryotrons are now well known (see Office of Naval Research Report ACR-50 by Newhouse et al. entitled "Physics and Characteristics of the Crossed Film Cryotron—A Review, presented at the 1960 Office of Naval Research Symposium on Superconductive Techniques for Computing Systems"), but a brief review of their essential character of operation will be helpful in understanding the detailed circuit arrangement of the associative memory unit hereinafter considered.

A crossed-film cryotron may be symbolically represented as shown in FIG. 2. It includes a "gate" film of tin formed on one surface of a thin insulating wafer of silicon oxide and serially included in a controlled circuit such as the circuit 35. A much narrower control conductor comprised by a lead film is formed on the opposite surface of the insulating wafer and oriented at right angles to the gate conductor, and this control conductor is serially included in a control circuit such as the circuit 36. In the absence of a control current of preseleted minimum value (known as a "full" current value) flowing in the control circuit 36, the cryotron gate conductor element is superconductive and thus presents no resistance to current flow in the controlled circuit 35. A full value of current flowing in the control circuit 36, however, causes the cryotron gate conductor element to become resistive and thus reduce the value of current flowing in the controlled circuit 35.

The manner in which cryotrons are conventionally used to provide information bit storage is shown in FIG. 3. The storage circuit is energized by a unidirectional potential source connected with positive polarity to a terminal 37 and connected with negative polarity to a terminal 38, and is comprised by two conductive branch circuits 39 and 40 connected between the terminals 37 and 38. The circuit 39 includes the gate element of a cryotron 41 and the control element of a cryotron 42, while the circuit 40 includes the gate element of the cryotron 43 and the control element of a cryotron 44. When a source of control current is connected between a pair of terminals 45 and 46 between which extends a control circuit including the control element of the cryotron 41, the resultant control current causes the gate element of the cryotron 41 to become resistive and thus causes current to flow from the terminal 37 through the circuit 40 including the superconductive cryotron 43 and the cryotron 44 to the terminal 38 thus producing a "0" current which is considered to represent storage of an information "0" code bit. Once this flow of current is initiated, it will continue even though current ceases to flow through the control element of the cryotron 41 and no current will flow through the conductive circuit 39 even though the cryotron 41 is no longer resistive. In similar manner, control current flowing from a terminal 47 to the terminal 46 through the control element of the cryotron 43 will render this cryotron resistive to terminate any current flow in the circuit 40 and establish current flow in the circuit 39 which includes the cryotrons 41 and 42. This newly established current flow, considered to store an information "1" code bit, continues upon termination of control current flow through the cryotron 43 even though the gate element of the latter becomes superconductive.

To sense the storage state of the storage arrangement just described, a potential is applied between a terminal 48 and each of terminals 49 and 50. The control gate element of the cryotron 42 is included in a circuit between the terminals 48 and 49 so that current will flow in this circuit if no current flows in the branch circuit 39 since the control gate of the cryotron 42 is then superconductive, whereas the current flow in the circuit 40 renders the control gate of the cryotron 44 resistive and thus restricts current flow through the controlled circuit which includes this gate and extends between the terminals 48 and 50. Current flow thus established between the terminals 48 and 49 as described senses the storage of an information "0" code bit in the storage arrangement. In similar manner, the storage of an information "1" code bit with resultant current flow in the circuit 39 would result in a resistive cryotron gate 42 and a superconductive cryotron gate 44 and thus establish current flow from the terminal 48 to the terminal 50 to sense the storage of the "1" code bit.

Referring now more particularly to the circuit diagram of FIGS. *4a–4d*, which show the detailed circuit arrangement of a representative form of information storage system embodying the invention, the control unit 11 is shown for simplicity as including only three stages of a closed ring form of stepping counter. Each such stage includes two cryotron storage circuits; these are storage circuits 55 and 56 for the first stage, the storage circuits 57 and 58 for the second stage, and the storage circuits 59 and 60 for the third stage. A write control conductor 61 is included in the control channel 13 extending from the read-control unit earlier described in connection with FIG. 1. This circuit branches at the storage circuit 55 into branch circuits **61*a* and 61*b* which include the gate elements of repective "1" and "0" cryotrons provided in the "1" and "0" branches of the storage circuit 55. The conductor 61*a* similarly branches at the storage circuit 57 into circuits 61*a'* and 61*b'* which include the gate elements of respective "1" and "0" cryotrons of the second counter stage storage circuit 57. The circuit 61*a'* further branches at the third stage storage circuit 59 into two branches 61*a''* and 61*b''* which include the gate elements of respective "1" and "0" cryotrons of the storage circuit 59. The circuits 61*a''* terminates at an error device 62 which if energized indicates erroneous operation of the control unit 11. The branch conductor 61*b''* thereafter passes through the control element of a "1" cryotron of the storage circuit 60 and the control element of a "0" cryotron of the storage circuit 56 to a W3 write-control circuit conductor. The circuit 61*b'* likewise continues through the control element of a "1" cryotron of the storage circuit 58 and the control element of a "0" cryotron of the storage unit 60 in the third counter stage to a W2 write-control circuit conductor. The branch 61*b* of the write-control circuit 61 extends through the control element of a "1" cryotron in the storage circuit 56 of the first counter stage and through the control element of a "0" cryotron of the storage circuit 58 of the second counter stage to a W1 write-control circuit conductor. An OFF circuit conductor 63 of the control channel 13 is energized alternatively with the write-control conductor 61 from the read-control unit 14 (FIG. 1), this energization being shown for simplicity as effected by a single-pole triple-throw switch 54. The OFF control conductor 63 extends as shown through the control elements of both "1" and "0" cryotrons of the storage circuit 55 and through gate elements of both "1" and "0" cryotrons of the storage circuit 56 of the first stage, and further extends in similar manner through cryotron gates and control elements of the storage circuits 57 and 58 of the second stage and cryotron gates and control elements of the storage circuits 59 and 60** of the third stage.

In considering the operation of the counter just described, assume at the outset that the storage circuits 55 and 56 are both set to store a "1" and that all other storage circuits of the counter stages are set to store a "0." Upon energization of the write-control conductor 61 by the switch 54, current will flow through the "0" gate of the storage circuit 55 and through the control element of the "1" cryotron of the storage circuit 56 (thereby setting the latter to store a "0") and will flow through the control element of the "0" cryotron in the storage circuit 58 (thereby setting this storage circuit to a "1") to energize the write-control circuit conductor W1. Now when the OFF circuit control conductor 63 is energized through the switch 54, current flow is restricted by the resistive gate of the "0" cryotron of the storage circuit 56 and is caused to flow through the control element of the "1" cryotron of the storage circuit 55 (thus to set the latter to the same "0" setting as the storage circuit 56) and in similar manner the storage circuit 57 is set to the same "1" setting as the storage circuit 58 of the second counter stage. Each energization of the OFF conductor 63 is thus effective to set the left-hand storage circuit of each counter stage to the same prevailing setting as the right-hand storage circuit of that stage.

Upon the next energization of the write-control conductor 61, cuttent flow will be established through the gate of the "1" cryotron of the storage circuit 55, the gate of the "0" cryotron of the storage circuit 57, the control element of the "1" cryotron of the storage corcuit 58 (thus setting the latter to "0"), and the control element of the "0" cryotron of the storage circuit 60 to set the latter to a "1" and energize the write-control conductor W2. Upon the next energization through the control switch 54 of the OFF control conductor 63, the storage circuit 57 will be set to a "0" corresponding to the setting of the storage circuit 58 and the storage circuit 59 will be set to a "1" corresponding to the setting of the storage circuit 60.

When the switch 54 again energizes the write-control conductor 61, current flow is similarly established through the several storage circuits 55–60 to set the storage circuit 56 to a "1" an energize the write-control conductor W3, and subsequent energization through the switch 54 of the OFF control conductor 63 causes the storage circuit 55 also to be set to a "1" to correspond to the setting of the storage circuit 56 and thereby complete a full counting cycle of the control unit 11.

Figure 4:
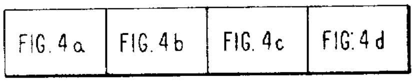
Figure 4A:
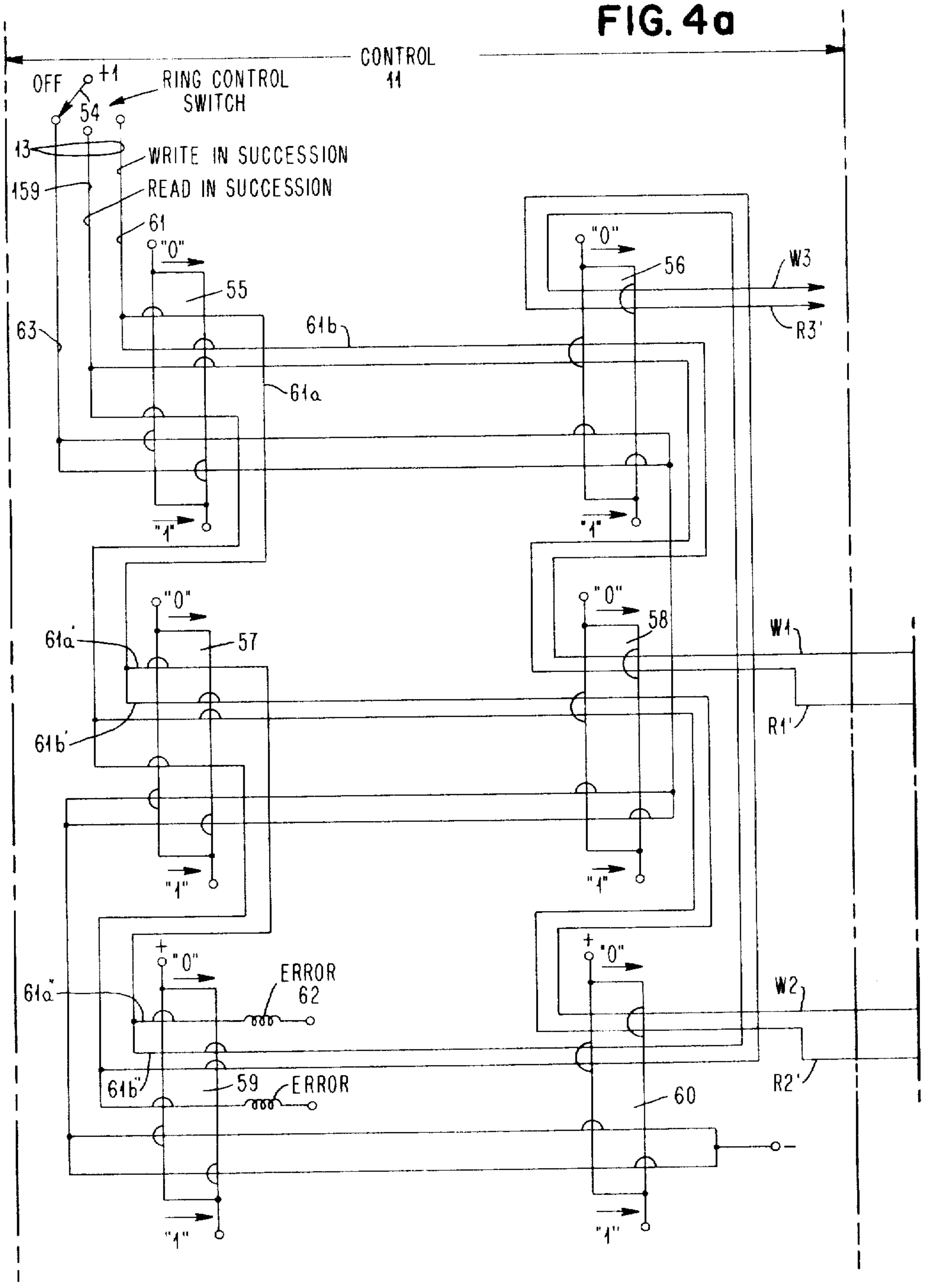
Figure 4B:
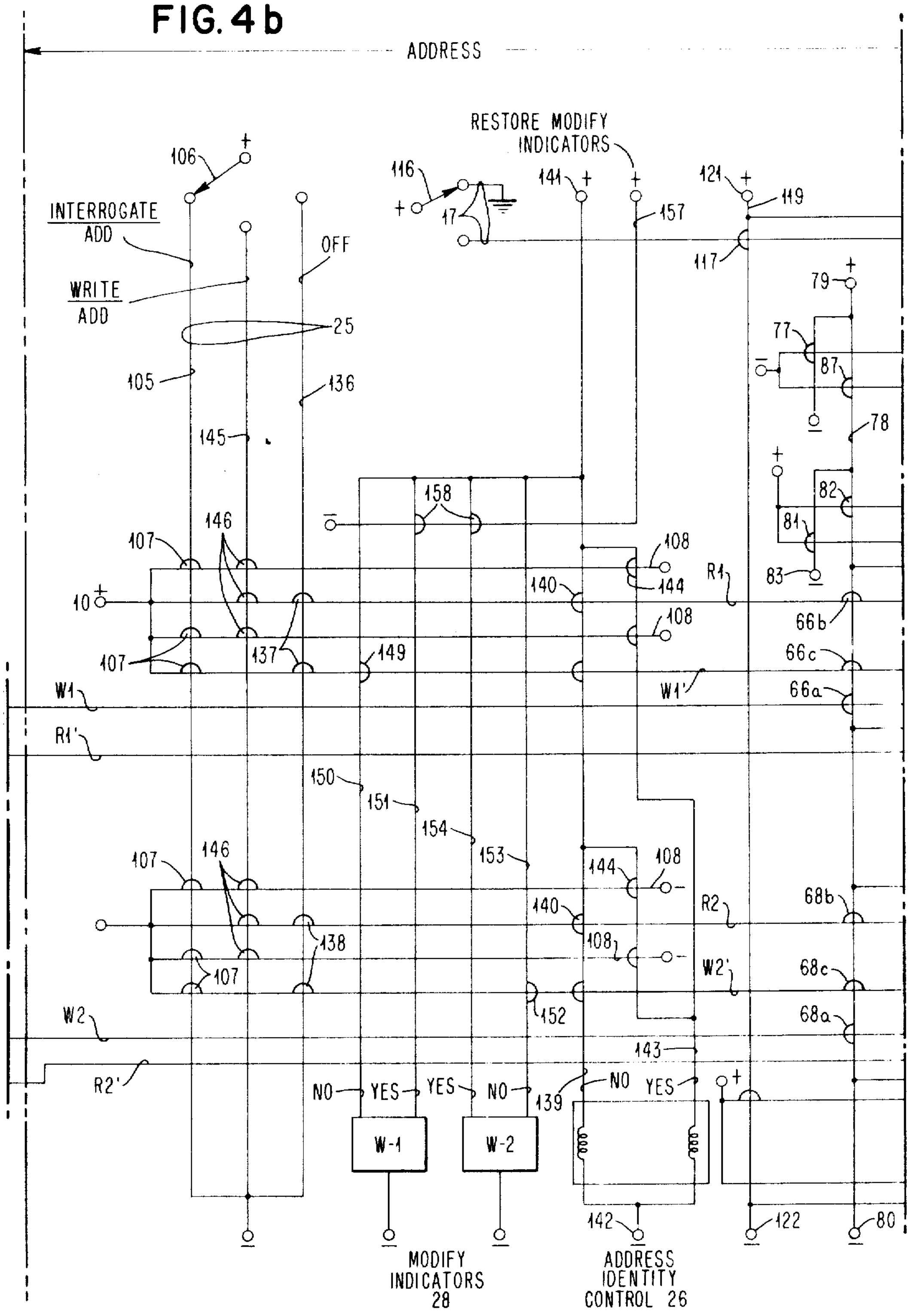
Figure 4C:
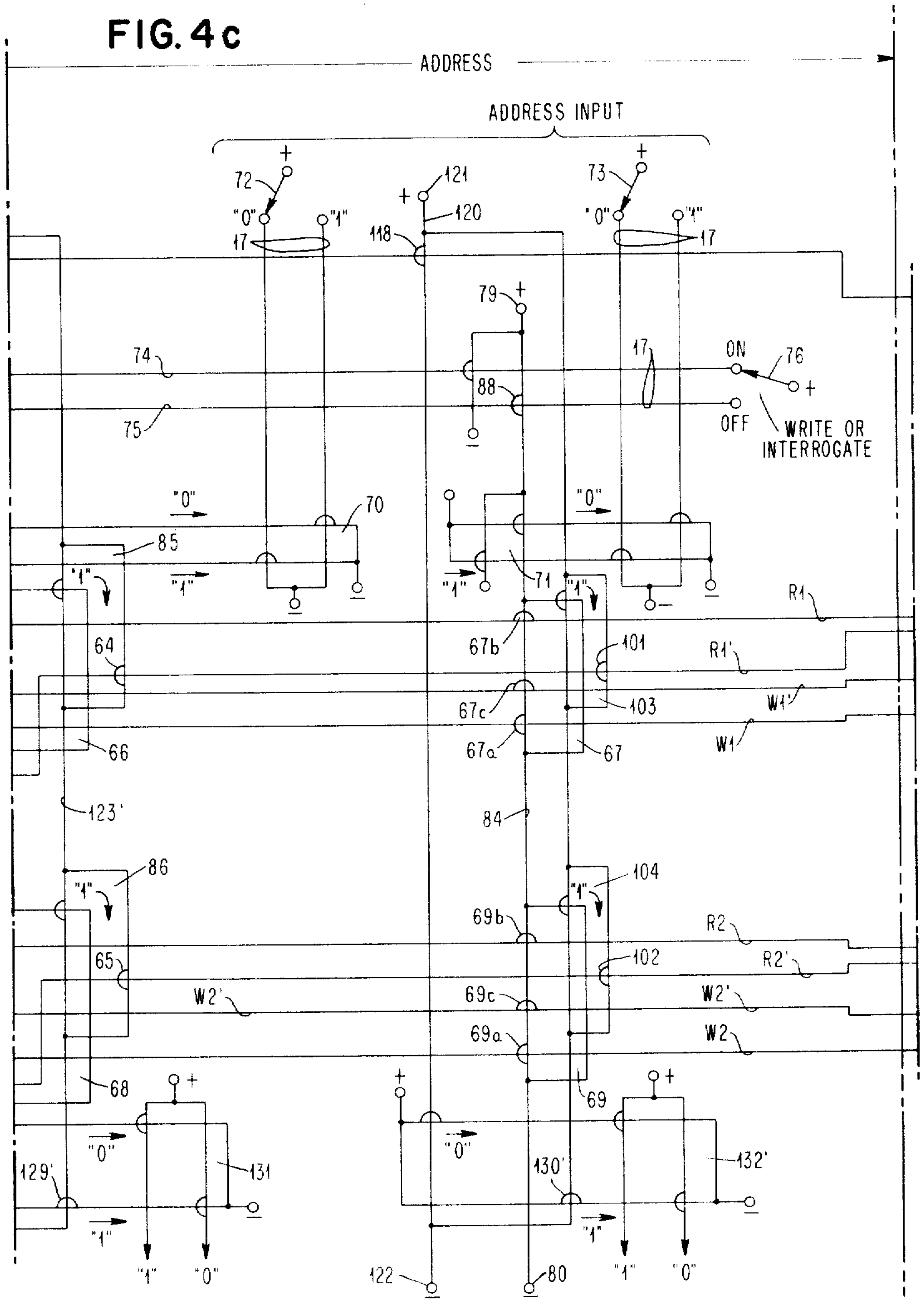
Figure 4D:
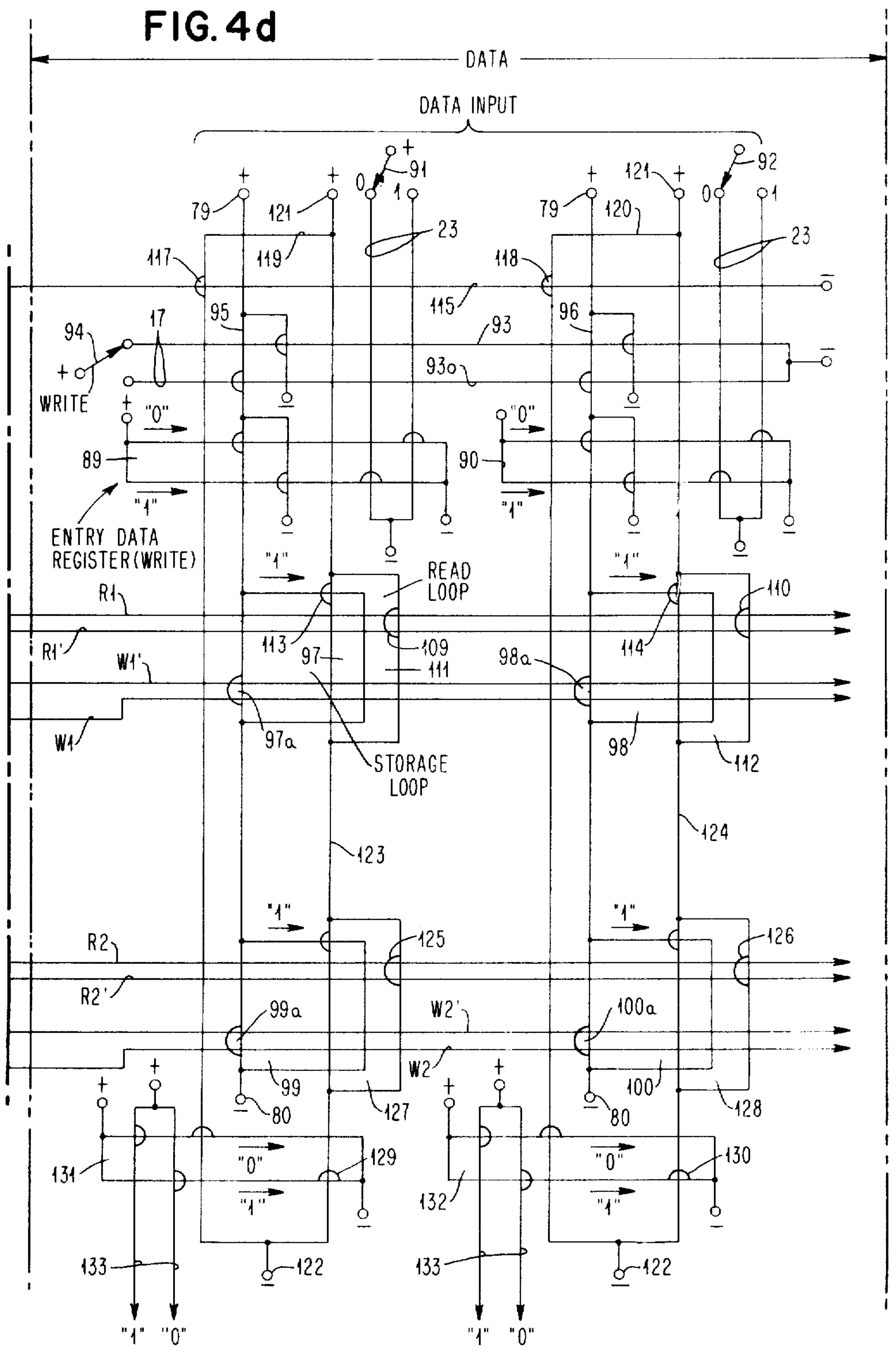

The storge system of FIG. 4 for simplicity shows only two word storage registers, each having a word storage portion and a data storage portion. Also for simplicity, the address storage portion and data storage portion of each word storage register are both shown as having only two information code bit storage capacities. Thus the address storage portion of the first word register includes storage circuits comprised by a persistent current loop 66 and a persistent current loop 67 for storing two information code bits of the first word address, and the address portion of the second word register includes similar loops 68 and 69 for storing the two address code bits of a second word. Clockwise circulating current in these loops represents the storage of a "1" code bit and the absence of loop current represents the storage of a "0" code bit. Each of the storage loops 66 and 67 includes in a left hand circuit leg the gate element of respective cryotrons **66*a* and 67*a* having a control element energized by the write conductor W1, and the storage loops 68 and 69 similarly include in their left hand legs the gate element of respective cryotrons 68*a* and 69*a*** having a control element energized by the write control conductor W2.

The associative memory storage unit also includes an entry address storage portion (18–1 in FIG. 1) which includes two storage circuits 70 and 71 for temporarily storing two information code bits of an interrogating address. The code bits of the entry interrogating address are supplied to the storage circuits 70 and 71 through "0" and "1" bit conductor pairs of the address channel 17, the conductors of a pair being alternatively energized by the address control unit 16 (FIG. 1) which for convenience is represented in FIG. 4 as effecting energization through single pole double throw switches 72 and 73. The address channel 17 also includes conductors 74 and 75 alternatively energized, again for simplicity shown as accomplished through a single pole double through energizing switch 76, from the address control unit 16.

When an address is supplied from the address unit 16 for storage in the entry address register comprised by the storage circuits 70 and 71, the switches 72 and 73 energize one of the "0" or "1" bit conductors and the switch 76 concurrently energizes the conductor 74. If the switch 72 energizes the "0" bit conductor, for example, the control element of a "1" cryotron in the storage circuit 70 makes this cryotron resistive and initiates a "0" current flow in the zero branch of the storage circuit. In similar manner, energization by the switch 72 of the "1" bit conductor energizes the control element of a "0" cryotron of the storage circuit 70 to initate current flow in the "1" branch of the storage circuit. Thus the storage circuits 70 and 71 are each set to store a "0" or "1" address code bit depending upon the energization by the switches 72 and 73 of the address channel conductors 17. Energization of the conductor 74 by the switch 76 causes the control element of a cryotron 77 to make this cryotron resistive and thus establish current flow through a conductor 78 from a current source coupled to input terminals 79 and 80 with the polarities indicated. If the storage circuit 70 stores a "1" code bit to establish a current flow through the control element of a "1" cryotron 81, the current established in the line 78 flows downward in this line through the "0" cyrotron 82 of the storage circuit 70; otherwise a "0" bit stored in the storage circuit 70 would cause the "0" cryrotron 82 to divert the current in the line 78 through the cryotron 81 to a terminal 83 of the energizing source connected to the terminal 79. A similar operation takes place with respect the storage circuit 71 to establish current flow downwardly through a circuit conductor 84 if the storage circuit 71 stores a "1" bit.

Assume at this time that the control unit 11 energizes the write-control conductor W1. The current flowing through this conductor passes through control elements of the write cryotrons **66*a* and 67*a* of the storage loops 66 and 67, and in rendering these cryotrons resistive terminates any persistent current flow through these loops as representative of previously stored "1" address code bits. Now if current flows downwardly through either or both of the conductors 78 and 84, this current is diverted by the resistive state of the cryotrons 66*a* and 67*a* to flow clockwise around the loops 66 and 67 and through the storage loops 68 and 69 to the negatively energized terminals 80; absence of a current flowing downwardly through either or both of the conductors 78 and 84 leaves the associated storage loops 66 or 67 without persistent current flow when the write-control conductor W1 is deenergized. A persistent current flow established in either storage loop 66 or 67 continues through the right hand branch of these loops when the control conductor W1 is denergized to restore the cryotrons 66*a* and 67*a* to their superconductive state. Movement of the switch 76 to energize a conductor 75 produces current flow through the control element of cryotrons 87 and 88 having gate elements included in the respective conductive circuits 78 and 84, and thus terminates further current flow through these conductors to terminate the storage operation. The collapse of the current flow in the respective conductive circuits 78 and 84 induces a persistent clockwise circulating current in those storage loops which had a "full" current flow through their right hand branch. In those storage loops that had no current in their right hand branch, no persistent current is induced. Thus a "0" or "1" code bit stored in the address entry storage circuits 70 and 71 is transformed to corresponding storage in the storage loops 66 and 67**.

Energization of the write-control conductor W2 by the control unit 11 effects similar storage in the storage loops 68 and 69 of address code bits corresponding to those stored in the address entry storage circuits 70 and 71. The operation in this respect is the same as that just described except that write cryotrons **68*a* and 69*a* of the respective storage loops 68 and 69** are now controlled by energization of the write conductor W1.

The data storage portions of the word storage registers in the associative storage unit 10 have a construction and mode of operation very similar to that just described in connection with the address storage portions of the word storage registers. Thus the data storage portions have data entry storage circuits 89 and 90 which store data code bits inserted therein by energization of the "0" and "1" data input conductors of the data channel 23 under control of the data register 22 (FIG. 1), which control is shown for simplicity of explanation as effected by single-pole double-throw switches 91 and 92. During a write operation, a write conductor 93 is energized (such energization being shown for simplicity as effected by a single-pole double-throw switch 94) to establish current flow downwardly in conductors 95 and 96 through cryotrons in the storage circuits 89 and 90. Energization of the write conductor W1 in conjunction with current flow in the conductors 95 and 96 controls the storage of data code bits in storage loops 97 and 98 of the first word register in the same manner as previously described with respect to storage of address code bits in the address storage loops. Energization of the write conductor W2 in conjunction with current flow through the conductors 95 and 96 similarly effects storage of data code bits in storage loops 99 and 100 of the second word storage register. Thus a data word inserted in the entry storage circuits 89 and 90 is transferred by energization of the write-control conductors W1, W2, etc., to storage in the same selected word storage register as stores the address of this word in the address portion of the word storage register. The write operation is terminated by deenergization of the write-control conductors W1 or W2 and by energization of an OFF conductor $93_0$ through the switch 94 to terminate storage current flow in the conductors 95 and 96 and leave persistent current flow in the storage loops 97–100.

Whenever it is desired to read from the words stored in the associative storage unit a data word having a particular address, the address of the desired word is supplied by the address control unit 16 (FIG. 1) for storage in the address entry storage circuits 70 and 71 and a conductor 105 of the control channel 25 from the read control unit is reenergized (shown for simplicity as energization effected through a single-pole double-throw switch 106). Energization of the read conductor 105 causes plural transfer cryotrons 107 associated with each storage register to become resistive and thus transfer current fom OFF conductive circuits 108 to a read interrogating circuit R1, R2, etc. of each word storage register. At the same time, the address control unit 16 which supplied the interrogating address to the storage circuits 70 and 71 also energizes through the switch 76 the conductor 74 of the address channel 17. This establishes a condition of current flow or lack of current flow in the conductors 78 and 84 in the manner previously explained and according to whether the storage circuits 70 and 71 respectively store a "1" or a "0" address code bit. Assume that current flows downwardly both of the conductors 78 and 84 corresponding to "1" code address bits stored in both of the storage circuits 70 and 71, and further assume that the storage loops 66 and 67 also store "1" address code bits. The downwardly flowing current in the conductors 78 and 84 is diverted around the right hand branch of the storage loops 66 and 67 by the persistent currents of these loops so that no current flows in their left hand branches at this time. The left hand branches of the storage loops 66 and 67 include the control elements of interrogation read cryotrons **66*b* and 67*b*, having gate elements included in the read interrogation circuit R1. The absence of current flow in the left hand branches of the storage loops 66 and 67 under the assumed conditions causes the read interrogation cryotrons 66*b* and 67*b* to be superconductive, thus permitting a full value of current flow to be established in the read interrogate conductor R1. The read interrogate control circuit R1 includes the control elements of read out cryotrons 109 and 110 which have their gate elements included in the right hand branch of respective read loops 111 and 112. The latter have left hand branches which include the gate elements of respective cryotrons 113 and 114, the control elements of which are included in the right hand branches of the respective storage loops 97 and 98**.

The address control unit 16 (FIG. 1) energizes a reset control conductor 115 during the intervals between successive read-interrogate operations, such energization being shown for simplicity as effected through a single-pole double-throw switch 116, which includes the control elements of read-out register reset cryotrons 117 and 118 associated with both address and data read-out registers. The cryotrons 117 and 118 have gate elements included in respective circuits 119 and 120 connected between terminals 121 and 122 energized by a current source with the polarities indicated. Energization of the reset control circuit 115 thus causes the cryotrons 117 and 118 to terminate any current flow in the respective conductors 119 and 120 and initiate current flow through respective branch conductors 123, 123', 124 and 124'. In a non-read interval, the current in the branch conductor 123' flows through the gate elements of superconductive read cryotrons 64 and 65 included in respective address-bit read loops 85 and 86 associated with the respective address storage loops 66 and 68; similarly, the current in the branch conductor 123 flows through the gate element of the superconductive read cryotron 109 and through a similar superconductive read cryotron 125 having a gate element included in a read loop 127 associated with the storage loops 99 as shown. Likewise the current in the branch conductor 124' flows through the gate elements of superconductive cryotrons 101 and 102 included in respective read loops 103 and 104 associated with the respective address storage loops 67 and 69, and the current in the branch conductor 124 flows through the gate element of the superconductive cryotron 110 and the gate element of a superconductive cryotron 126 included in a read loop 128 associated with the storage loop 100. The currents in the branch conductors 123', 124', 123 and 124 thereafter flow and through the control elements of respective cryotrons 129', 130', 129 and 132 having gates included in the "1" current branch of respective address and data output storage circuits 131', 132', 131 and 132. This renders the cryotrons 129', 130', 129 and 130 resistive and insures current flow through the "0" current branches of the storage circuits 131', 132', 131 and 132. This renders the cryotrons 129', 130', 129 and 130 resistive and insures current flow through the "0" current branches of the storage circuits 131', 132', 131 and 132 so that the latter are reset during each non-read interval to store "0" code bits.

At the outset of a read interrogation operation, the address control unit 16 (FIG. 1) removes energization from the reset conductor 115 as by opening the switch 116. Energization of the read interrogate conductors R1 or R2 in the manner previously described reduces current flow through the right hand branches of the associated read loops 111 and 112 or 127 and 128 by rendering their associated cryotrons 109 and 110 or 125 and 126 resistive. Assume that the read conductor R1 is energized at this time, that a "1" data bit is stored in the storage loop 97 as indicated by a persistent current flow in this loop, and that a "0" data bit is stored in the storage loop 98 as evidenced by absence of persistent current flow in this loop. The persistent current flowing in the storage loop 97 renders the cryotron 113 resistive, and the resistive states of both of the cryotrons 109 and 113 thus reduce current flow in the conductor 123 and transfers it to the conductor 119 where it may flow by reason of the now superconductive state of the gate element of the cryotron 117. This current flows through the control element of the "0" branch cryotron of the storage circuit 131 to transfer current in the latter to its "1" branch, thus transferring the "1" stored in the storage loop 97 to the data output storage circuit 131. Since it was assumed that the storage loop 98 stores a "0" data bit, evidenced by the absence of current in this loop, the resultant superconductive state of the cryotron 114 permits the continuance of current flow in the conductor 124 when the cryotron 110 of the read loop 112 is rendered resistive under the previously adopted assumption that current flows through the read control conductor R1. This continuing current flow in the conductor 124 maintains the gate of the cryotron 130 resistive and thus continues the current flow through the "0" branch of the data output storage circuit 132 so that the "0" data code bit stored in the latter corresponds to the "0" data code bit stored in the storage loop 98. The storage circuits 131 and 132 each have "0" and "1" output circuits 133 which are energized through the gate elements of cryotrons having control elements included in the "0" and "1" branches of the storage circuits as shown, whereby the output circuits 133 supply to the data processing system indications of the data code bits stored by a read operation in these storage circuits.

At the end of the read operation, an OFF conductor 136 of the control channel 25 is energized by transfer of the switch 106. Control elements of cryotrons 137 and 138 are included in the circuit 136 so that these cryotrons transfer the current in any read control conductor R1, R2, etc. which was energized during the read operation to the OFF branch circuits 108.

The address identity control unit 26 has a first input circuit 139 energized through the gate elements of cryotrons 140 from terminals 141 and 142 connected to a source of energization with the polarities indicated. A second input circuit 143 of the control unit 26 is energized through the gate elements of cryotrons 144 controlled by the OFF circuits 108 as shown. It will be evident that the input circuit 139 is energized in the absence of control current through any of the read control circuits R1, R2, etc., and thus is energized in the intervals between read operations or is energized during a read-interrogate operation to indicate lack of identity between an interrogating address stored in the storage circuits 70 and 71 and the word addresses stored in the storage loops 66–69. The input circuit 143 of the control unit 26 is energized whenever identity of addresses is found to prevail during a read-interrogate operation as evidenced by a full value of energization of one of the read control circuits R1, R2, etc. As earlier mentioned, these alternate energizations of the address identity control unit 26 may be used to control the address control unit 16 (as by opening and closing gates in the address channel 20 thereof) to permit or suppress read out of words from the main storage unit 12 under control of the address unit 16. It may be noted in this respect that energizations of the OFF branch conductors 108 at the end of each read interval always effects energization of the input circuit 139 of the identity control unit 26, and that this energization of the input circuit 139 continues to prevail unless an identity of addresses effects energization of the input circuit 143 of the control unit 26.

It is sometimes desired that a data word stored with its address in the associative memory be updated or modified or even replaced by a different data word but without change of the word address. This may be accomplished by energization of a write conductor 145 of the control channel 25 by transfer of the switch 106. Current flow in the conductor 145 controls cryotrons 146 which reduce current flow in the OFF branch conductors 108 and read conductors R1, R2 to transfer current flow to write circuits W1′ and W2′. The write circuit W1′ includes the gate elements of cryotrons 66c and 67c having control elements included as shown in the respective address storage loops 66 and 67. The write circuit W2′ likewise includes the gate elements of cryotrons 68c and 69c having control elements included as shown in the address storage loops 68 and 69. For this write operation, an interrogating address is stored in the storage circuits 70 and 71 as in a read-interrogate operation, and the interrogate conductor 74 is energized through the switch 76 to initiate current flow through the conductors 78 and 84. As in the read-interrogate operation previously described, an identity between the word addresses stored in the word adress storage loops 66 and 67 or 68 and 69 with that stored in the storage loops 70 and 71 effects full energization of one of the write conductors W1′ or W2′. The write conductors W1′ includes the control elements of the cryotrons 97a and 98a of the respective data storage loops 97 and 98, and the write circuit W2′ includes the control elements of the cryotrons 99a and 100a of the respective data storage loops 99 and 100. Thus it will be evident that full energization of the write conductor W1′ by address identity will effect storage in the data storage loops 97 and 98 of data stored in the storage circuits 89 and 90 by a write operation of the type earlier described with respect to data storage effected under control of the control unit 11, and full energization of the write conductor W2′ will similarly effect storage in the data storage loops 99 and 100 of data stored in the storage circuits 89 and 90. In this it will be noted that data storage occurs only in a word storage register having a stored word address identical with the interrogating address, and that this data storage occurs without change of the stored address.

Full energization of the write conductor W1′ during the write operation just described controls a cryotron 149 to deenergize an input circuit 150 and to energize an input circuit 151 of a corresponding W–1 one of the modify indicators 28 to provide an indication that the word in this word storage register has been modified or replaced, and full energization of the write conductor W2′ control a cryotron 152 to deenergize an input circuit 153 and to energize an input circuit 154 of a W–2 one of the modify indicators 28 to indicate that the data word in this word storage register has been modified or replaced. When writing data into the associative storage unit in the manner just described, the data processing system would not ordinarily place this data into storage in the main memory storage unit 12 (FIG. 1), but rather would use the modify indications of the indicators 28 to indicate the change of data in the associative storage unit so that if desired the changed data may be read from the latter unit and placed into a storage location or storage locations in the main memory storage unit at an address location or locations specified by the address portion of each data word thus read out from the associative storage unit in a manner presently to be described. The input circuits 150 and 153 of the respective W–1 and W–2 modify indicators are again energized at some later time, when it is desired that the indicators be reset, by appropriate energization of a conductor 157 which controls cryotrons 158 to terminate any current flow in the input conductors 151 and 153 of the modify indicators. While this reset as shown is common to all of the indicators, individual reset control circuits may be provided for each such indicator if desired.

When it is desired that data information stored in the word storage registers of the associative memory unit be read out successively by storage location, the read control unit 14 (FIG. 1) energizes through the control channel 13 a read conductor 159 which extends through a system of cryotrons in the storage circuits 55–60 of the control unit 11 in identical manner to the write circuit 61 earlier described. Thus each alternate energization of the read conductor 159 and the OFF conductor 63 under control of the read control unit 14 advances the count of the control unit 11 to effect successive energizations of a plurality of read-control output circuits R1′–R3′. The latter extend through the read control cryotrons of the read loops in individual ones of the word storage registers as shown in FIG. 4 so that successive energizations of the read-control conductors R1′–R3′ and concurrent deenergization of the reset conductor 115 effect sequential read out of data words and their associated addresses from successive word registers to the data output register 24. Each such read out operation is identical to that earlier described except that the read conductors R1′–R3′ effect read-out to the address output storage circuits 131′ and 132′ of the address associated with the data read out to the data storage circuits 131 and 132.

Sequential read out operations of the type last described may be combined with sequential word storage of the type first described. Reading the data information and its address out of a word register just prior to storing new data information in the register allows the data processing system to make a test and ascertain whether the old data information has been modified or replaced and thus determine whether this information should be returned to storage in the same storage location of the main memory storage unit. This composite read-write operation is effected by successive energizations of the read conductor 159, the write conductor 61, and the OFF conductor 63 in that order to effect an initial read operation followed by a write operation and a subsequent advance of count of the control unit 11 (it may be noted that energization of either the read conductor 159 or the write conductor 61 initiates the counter advance, but the counter does not actually complete the advance until subsequent energization of the OFF conductor 63).

The information storage system just described has particular utility in automatically providing a continuing "mirror image" of the latest series or set of the most recently executed instruction words (and their addresses) used in data processing operations. The number of instruction words thus made available is dependent upon the word storage capacity of the associative memory unit which is usually selected, dependent upon cost and need, to retain principal and subroutine instruction loops of reasonable length. Should the data processing system go into a principal or subroutine loop, address interrogation of the associative memory unit allows a very fast instruction fetch for all of the loop instruction words. If an interrogation should not find the desired instruction word in the associative memory unit, it is read from the main memory storage for execution and concurrent storage in the associative memory unit where the word is thereafter available for fast fetch. Use of instruction words from the associative memory unit may be, except for the first use of a word, entirely automatic and independent of the programmer. For applications of this nature, the address control unit 16 receives entry and interrogation addresses from the instruction address counter or register of the data processing system and the register 22 comprises the instruction word register of the latter.

It will be apparent from the foregoing description of the invention that an associative information storage system embodying the invention may form a component of or may be used in association with an information storage unit of large storage capacity and when so used will relieve substantially the volume of access demands made upon the large storage system. An information storage system embodying the invention has the further advantage that it permits exceptionally fast access time to data stored therein and is automatically operative to preserve and make rapidly available as selectively required a limited quantity of current information supplied from a larger capacity storage system and repetitively used in data processing operations. The storage system of the invention has the additional advantage that it is characterized by unique operational flexibility permitting as desired at any time the successive storage and successive read out of information words successively presented for storage, or the successive storage and address-selective random read out of stored information words, and also the address-selective random modification of one or more words in storage accompanied by an indication identifying each word so modified.

While a specific form of the invention has been described, for purposes of illustration, it is contemplated that numerous changes may be made without departing from the spirit of the invention.

What is claimed is:

1. An information storage system comprising an associative information storage unit requiring relatively short information-access time and having a relatively small number of discrete storage locations, means responsive to each succeeding one of a preselected type of address-selected read-out operation of a storage unit having large information word capacity but relatively long access time for automatically effecting storage in successively selected storage locations of said associative storage unit of at least an identifiable portion of the address supplied to the large capacity storage unit and at least a portion of the address-selected word read therefrom, and means controlled by an identifying portion of a selection address supplied at any time to said associative storage unit for effecting rapid-access information translation with respect to any storage location thereof which stores an address identifying portion corresponding to said identifying portion of the selection address.

2. An information storage system according to claim 1 wherein said associative storage unit includes an interrogating storage location for receiving and temporarily storing said selection address, and wherein said discrete storage locations of said associative information storage unit store in each of said successively selected storage locations the selection address stored in said interrogating storage location and supplied to the large capacity storage unit and the corresponding address-selected word read therefrom.

3. An information storage system according to claim 2 wherein said discrete storage locations of said associative information storage unit are each comprised by a word and word-address storage register, and said interrogating storage location of said associative storage unit is comprised by an address interrogating storage register.

4. An information storage system comprising an associative information storage unit requiring relatively short information-access time and having a relatively small number of discrete storage locations each adapted to store an information word and its identifying address, means responsive to each succeeding one of a preselected type of address-selected read-out operation of a storage unit having large information word capacity but relatively long access time for automatically effecting storage in successively selected storage locations of said associative storage unit of the address supplied to the large capacity storage unit and the address-selected word read therefrom, and means controlled by a selection address supplied at any time for temporary storage in said associative storage unit for effecting rapid-access information word read out from any storage location thereof which stores an address corresponding to said selection address.

5. An information storage system comprising an associative information storage unit requiring relatively short information-access time and having a relatively small number of discrete storage locations each adapted to store an information word and its identifying address, means responsive to each succeeding one of a preselected type of address-selected read out operation of a storage unit having large information word capacity but relatively long access time for automatically effecting storage in successively selected word storage locations of said associative storage unit of the address supplied to the large capacity storage unit and the address-selected word read therefrom, and means controlled by a selection address supplied at any time to said associative storage unit for effecting rapid-access information word storage in any storage location thereof which stores an address corresponding to said selection address.

6. An information storage system according to claim 5 which includes means for indicating each storage location of said associative storage unit in which information word storage is effected by said means controlled by a selection address.

7. An information storage system according to claim 4 which includes means for indicating each information word read out operation effected in said associative storage unit by said means controlled by a selection address.

8. An information storage system comprising an associative information storage unit requiring relatively short information-access time and having a relatively small number of discrete storage locations and an information word input channel common to all thereof, means responsive to each succeeding one of a preselected type of address-selected read-out operation of a storage unit having large information word capacity but relatively long access time for automatically effecting storage in successively selected word storage locations of said associative storage unit of the address supplied to the large capacity storage unit and the address-selected word read therefrom and supplied to said input channel, and means controlled by a selection address supplied at any time to said associative storage unit and having two alternately selectable operative states of which one operative state effects rapid-access storage of an information word supplied to said input channel and in any storage location of said associative storage unit which stores an address corresponding to said selection address and the other of said operative states effects rapid-access information word read out from any storage location which stores an address corresponding to said selection address.

9. An information storage system comprising an associative information storage unit requiring relatively short information-access time and having a relatively small number of discrete storage locations and an information word input channel common to all thereof, means responsive to each succeeding one of a preselected type of address-selected read-out operation of a storage unit having large information word capacity but relatively long access time for automatically effecting storage in successively selected word storage locations of said associative storage unit of the address supplied to the large capacity storage unit and the address-selected word read therefrom and supplied to said input channel, means controlled by a selection address supplied at any time to said associative storage unit and having two alternately selectable operative states of which one operative state effects rapid-access storage of an information word supplied to said input channel and in any storage location of said associative storage unit which stores an address corresponding to said selection address and the other of said operative states effects rapid-access information word read out from any storage location which stores an address corresponding to said selection address, and means for indicating each information word read out operation effected by said control means and each storage location in which information word storage is effected thereby.

10. An information storage system comprising an associative information storage unit requiring relatively short information-access time and having a relatively small number of discrete storage locations each adapted to store an information word and its identifying address, sequential selection means for selecting successive ones of said storage locations for information word translation, means for controlling said selection means in response to each succeeding one of a preselected type of address-selected read-out operation of a storage unit having large information word capacity but relatively long access time for automatically effecting storage in successively selected storage locations of said associative storage unit of the address supplied to the large capacity storage unit and the address-selected word read therefrom, means for controlling said selection means to effect rapid-access read out of information words stored in successive ones of the storage locations of said associative storage unit, and means controlled by a selection address supplied at any time for temporary storage in said associative storage unit for effecting rapid-access information word read out from any storage location thereof which stores an address corresponding to said selection address.

11. An information storage system comprising a first information-storage unit requiring relatively long information-access time and having a large number of address-selectable word storage locations, a second information storage unit requiring relatively short information-access time and having a limited number only of storage locations, means responsive to each succeeding one of a preselected type of address-selected read-out operation of said first storage unit for automatically effecting storage in successively selected storage locations of said second storage unit of both an identifiable portion of the address supplied to and at least a portion of the word read from said first storage unit, and means controlled by an identifying portion of a selection address supplied to said second storage unit for effecting rapid-access information translation with respect to any storage location thereof which stores an address identifying portion corresponding to said identifying portion of the selected address.

12. An information storage system comprising a first information-storage unit requiring relatively long information-access time and having a large number of address-selectable word storage locations, a second information storage unit requiring relatively short information-access time and having a limited number only of storage locations, means for controlling said first storage unit to effect read out therefrom of successive data processing words at storage locations identified by addresses supplied by said control means, sequential control means responsive to each succeeding address-selected read-out operation of said first storage unit effected by said control means for automatically effecting storage in successively selected storage locations of said second storage unit of both an identifiable portion of the address supplied to and at least a portion of the word read from said first storage unit, means for controlling said sequential control means to effect rapid-access nondestructive word read out from successive storage locations of said second storage unit, and means controlled by an identifying portion of a selection address supplied to said second storage unit for effecting rapid-access nondestructive word read out from any storage location thereof which stores an address identifying portion corresponding to said identifying portion of the selection address.

13. An information storage system comprising a first information-storage unit requiring relatively long information-access time and having a large number of address-selectable word storage locations, a second information storage unit requiring relatively short information-access time and having a limited number only of storage locations, means for controlling said first storage unit to effect read out therefrom of successive data processing words at storage locations identified by addresses supplied by said control means, means responsive to each succeeding address-selected read-out operation of said first storage unit effected by said control means for automatically effecting storage in successively selected storage locations of said second storage unit of both the address supplied to and the word read from said first storage unit, and means controlled by a selection address supplied to said second storage unit and having two alternately selectable operative states of which one state effects rapid-access word read out from any storage location of said second storage unit which stores an address corresponding to said selection address and the other of said operative states effects rapid-access storage of a word supplied to said second storage means and in any storage location thereof which stores an address corresponding to said selection address.

14. An information storage system comprising a first information-storage unit requiring relatively long information-access time and having a large number of address-selectable word storage locations, a second information storage unit requiring relatively short information-access time and having a limited number only of word storage locations, means for addressing said first and second storage units to effect read out from said first storage unit of information words at storage locations identified by an address supplied by said control means, means responsive to each succeeding one of a preselected type of address-selected read-out operation of said first storage unit effected by said control means for automatically effecting storage in successively selected storage locations of said second storage unit of both the address supplied to and the word read from said first storage unit, means controlled by each address supplied by said addressing means for effecting rapid-access word read out from any storage location of said second storage unit which stores an address corresponding to said each supplied address, and means responsive to each read out operation of said second storage means for inhibiting read out operation of said first storage means.

15. An information storage system comprising: an associative information storage unit requiring relatively short information-access time and having a relatively small number of discrete storage locations; means responsive to each successive address-selected instruction-word read-out operation of a storage unit having large information word capacity but relatively long access time for automatically effecting storage in successively selected individual word storage locations of said associative storage unit, operated as a closed loop of storage locations, of the successive instruction words and their addresses read from the large capacity storage unit; and means responsive to a selection address supplied at any time to said associative storage unit for effecting rapid read-out therefrom of an instruction word stored in any storage location thereof which stores an instruction-word address corresponding to the supplied selection address.

16. An information storage system comprising: a first information storage unit requiring relatively long information-access time and having a large number of address-selectable word storage locations; a second information storage unit requiring relatively short information-access time and having a limited number only of word storage locations; means responsive to each successive address-selected instruction-word read-out operation of said first storage unit for automatically effecting storage in successively selected individual word storage locations of said second storage unit, operated as a closed loop of storage locations, of both each address supplied to and each instruction word read from said first storage unit; and means responsive to a selection address supplied at any time to said second storage unit for effecting rapid non-destructive read-out therefrom of an instruction word stored in any storage location thereof which stores an instruction-word address corresponding to said supplied selection address.

17. An information storage system comprising: a first information-storage unit requiring relatively long information-access time and having a large number of address-selectable word storage locations; a second information storage unit requiring relatively short information-access time and having a limited number only of word storage locations; and instruction word register; instruction-word address means for addressing said first storage unit to effect read out therefrom to said instruction word register of successive instruction words stored in storage locations thereof identified by the address supplied by said address means; means responsive to each succeeding address selected read-out operation of said first storage unit effected by said address means for automatically effecting storage in successively selected word storage locations of said second storage unit, operated as a closed loop of storage locations, of the address supplied by said address means and the instruction word read into said word register from said first storage unit; and means controlled by a selection address supplied to said second storage unit for effecting rapid non-destructive read out therefrom of an instruction word stored in any storage location thereof which stores an instruction-word address corresponding to said supplied selection address.

18. An information storage system comprising a first information-storage unit requiring relatively long information-access time and having a large number of address-selectable word storage locations, a second information storage unit requiring relatively short information-access time and having a limited number only of word storage locations, an instruction word register, instruction-word address means for addressing said first storage unit to effect read out therefrom to said instruction word register of successive instruction words stored in storage locations thereof identified by the address supplied by said address means, means responsive to each succeeding address-selected read-out operation of said first storage unit effected by said address means for automatically effecting storage in successively selected word storage locations of said second storage unit of the address supplied by said address means and the instruction word read into said word register from said first storage unit, means controlled by a selection address supplied by said address means to said second storage unit for effecting rapid non-destructive read out therefrom of an instruction word stored in any storage location thereof which stores an instruction-word address corresponding to said supplied selection address, and means responsive to said selection-address read out from said second storage unit for inhibiting read out to said register of a corresponding instruction word from said first storage unit.

19. An information storage system comprising a first information-storage unit requiring relatively long information-access time and having a large number of address-selectable word storage locations, a second associative storage unit requiring relatively short information-access time and having a limited number only of word storage locations, an instruction word register, instruction-word address means for addressing said first storage unit to effect read out therefrom to said instruction word register of successive instruction words stored in storage locations thereof identified by the address supplied by said address means, means responsive to each succeeding address-selected read-out operation of said first storage unit effected by said address means for automatically effecting storage in successively selected word storage locations of said second storage unit operated as a closed loop of storage locations of the address supplied by said address means and the instruction word read into said word register from said first storage unit, means controlled by a selection address supplied by said address means to said second storage unit for effecting rapid nondestructive read out therefrom of an instruction word stored in any storage location thereof which stores an instruction-word address corresponding to said supplied selection address, and means responsive to said selection-address read out from said second storage unit for inhibiting read out to said register of a corresponding instruction word from said first storage unit.

References Cited by the Examiner

UNITED STATES PATENTS 2,995,729 8/1961 Steele ------------ 340—172.5

ROBERT C. BAILEY, *Primary Examiner.*

M. LISS, *Assistant Examiner.*